United States Patent
Thellmann

[19]
[11] Patent Number: 6,013,181
[45] Date of Patent: Jan. 11, 2000

[54] WATER FILTRATION SYSTEM

[76] Inventor: Rick Thellmann, 6881 Rook Dr., Huntington Beach, Calif. 92647

[21] Appl. No.: 09/062,017
[22] Filed: Apr. 17, 1998
[51] Int. Cl.$^7$ .............................. B01D 24/00; B01D 29/56
[52] U.S. Cl. .......................... 210/266; 210/284; 210/287; 210/314; 210/416.3; 210/489; 210/504; 210/505
[58] Field of Search ...................................... 210/263, 264, 210/266, 284, 287, 314, 335, 416.3, 446, 488, 489, 503, 504, 505, 506, 508, 912

[56] References Cited

U.S. PATENT DOCUMENTS

| | | |
|---|---|---|
| 661,189 | 11/1900 | Olsen et al. . |
| 1,790,947 | 2/1931 | Rabjohn et al. . |
| 3,382,983 | 5/1968 | Stewart . |
| 3,715,035 | 2/1973 | Teeple . |
| 3,722,686 | 3/1973 | Arnett et al. . |
| 4,851,122 | 7/1989 | Stanley . |
| 4,888,118 | 12/1989 | Barnes et al. . |
| 4,906,381 | 3/1990 | Barbaro . |
| 5,064,534 | 11/1991 | Busch et al. . |
| 5,198,104 | 3/1993 | Menyhert . |

Primary Examiner—David A. Simmons
Assistant Examiner—Fred Prince
Attorney, Agent, or Firm—Dennis Beech

[57] ABSTRACT

The water filtration system has nine filter elements serially arranged in a hollow cylinder housing with a water inlet end and water outlet end having pipe fittings, such as, ¾ inches for installation in the main inlet water line of a household. For a normal household the housing is approximately 20 inches long and 4 inches in diameter. The first filter element on the water inlet end is a loose weave polyester fiber pad; the second filter element is multiple irregular polyethylene beads filling approximately 3 inches of the housing length; the third and seventh filter sections are a very fine plain wool filter floss; the fourth, sixth and eighth filter sections are one millimeter wool fibers impregnated with carbon to equal two thirds of the total weight of the fibers; the fifth filter element is multiple pharmaceutical grade carbon granules filling approximately 4 ½ inches of the housing length; and the ninth filter element is a fine mesh nylon screen. The filter elements eliminate up to 90% of chlorine, up to 92% of other foreign matter such as dirt, rust, fiber, sand, etc. from the municipal water supply.

5 Claims, 1 Drawing Sheet

WATER FILTRATION SYSTEM

BACKGROUND OF THE INVENTION

1. Field of the Invention

This invention relates to devices used to filter chemicals, solids, bacteria and other foreign matter from water. The new system contains water filtration stages in a single device which is easily attachable to the main inlet water line of a household or other facility.

2. Description of Related Art

There are currently in use many filtration and water conditioning system for home and industrial use which essentially are designed to improve some aspect of the water provided by the municipal water provider. Perhaps the most well know are those systems which may be attached to a main inlet water line to produce soft water. Such systems which have been used for many years require periodic servicing such as once a month in order to maintain proper operation.

There are also many varieties of water filters for attachment in water lines under sinks, on water coolers in offices and the like. Such devices contain some elements of a typical water filtering system such as polyester woven filters and carbon granules to reduce foreign elements in the supplied water. However, these filter devices are typical simple one to three stage devices for use with a particular apparatus such as a water cooler or sink. Such devices do not incorporate the necessary elements or flow design to filter for an entire facility such as a house.

The present invention provides a simple means to attach a filter system to the inlet water supply of a facility such as a house which will filter the water for the entire house. The water filter system is a nine element system having the filter elements properly compressed and a diameter and length sized such that in normal operation the municipality supplied water pressure, usually 20 p.s.i., and the flow rate, usually 20 gallons per minute, g.p.m., only experience a small variation. The filter elements eliminate chlorine up to 90% and suspended solids and other foreign objects up to 92%. The water filtration system is usable for up to one year without service and normally is just replaced with a new unit.

SUMMARY OF THE INVENTION

One object of the present invention is to improve the purity of the water used in a particular facility such as a household. Another object is to extend the useful life of water filtration systems used with individual facilities. A further object is to include safety features such that a sudden pressure change or loosening of significant foreign matter in the water supply or filter is blocked from entering the facility water system.

In accordance with the description presented herein, other objectives of this invention will become apparent when the description and drawings are reviewed.

DESCRIPTION OF THE PREFERRED EMBODIMENT

The water filtration system consists of a hollow cylindrical housing with caps at each end having a 2 inch by ¾ inch diameter pipe fitting in each for the inlet and outlet flow of water. The cylinder with caps is 20 inches long and approximately 4 inches in diameter to provide proper filtering while minimizing the impact on the water flow rate and pressure. The internal filter elements are arranged serially in nine stages and the elements when installed are collectively compressed to 20 p.s.i. The selection of size and other elements provides the proper water flow venturi effect such that the water filtration system maintains relative flow rate and pressure at input and output as compared to a wider filter causing drops in facility water pressure and narrower units causing a drop in both pressure and flow rate. The end cap pipe fittings and other dimensions in this description are based on the normal personal household having a ¾ inch water pipe system. Obviously for other diameter installations, the relative dimensions would have to be changed to accommodate flow rate and also pressure if such varied.

Figure 1:
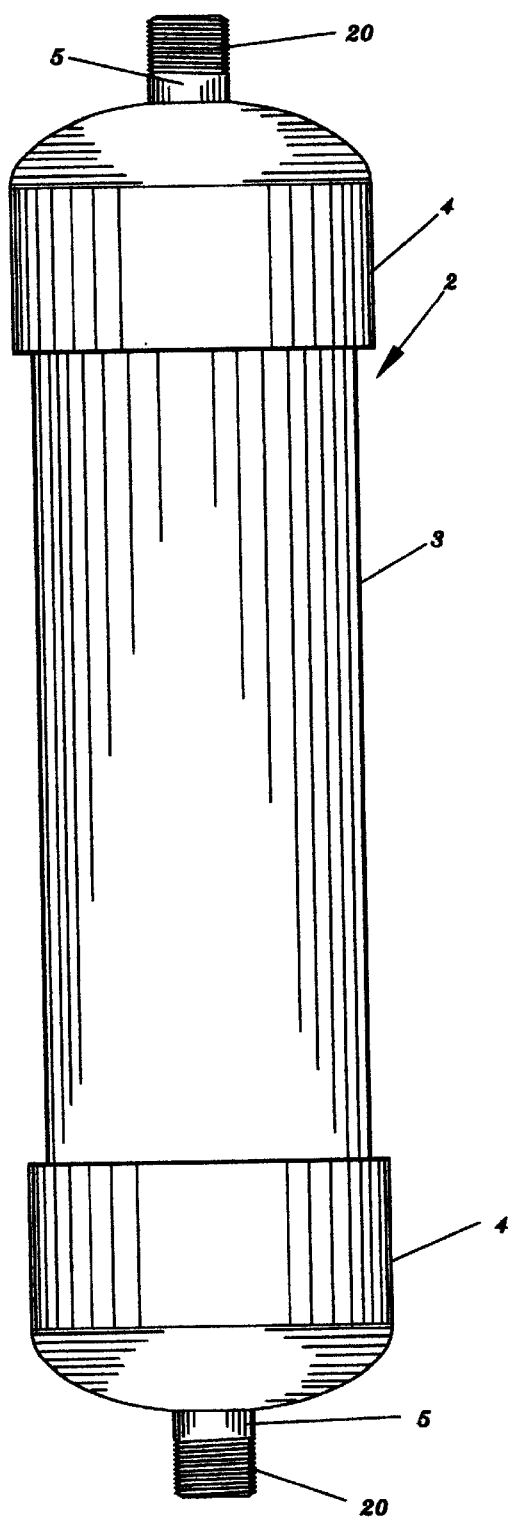
FIG. 1 illustrates a side view of the generally cylindrical water filter device.
Figure 2:
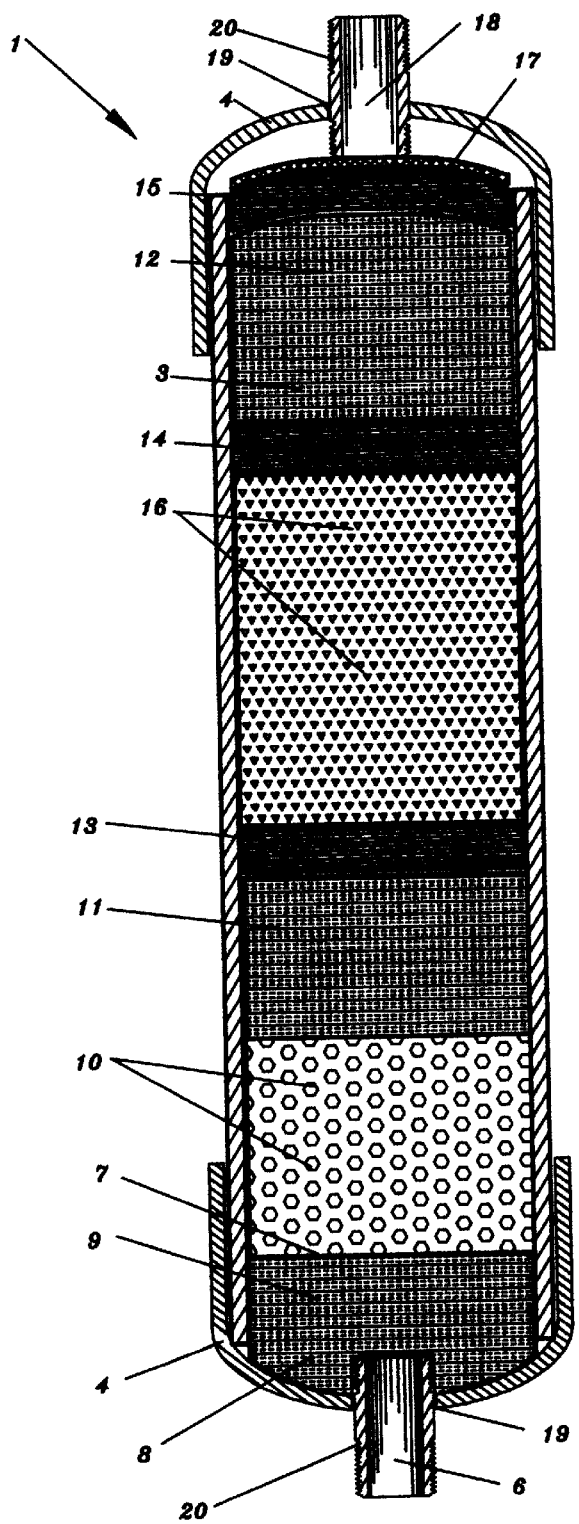
FIG. 2 illustrates a cut away view showing the housing structure and filter stage elements.

Referring to FIGS. 1 and 2, the water filtration system (1) has a housing (2) with a hollow cylindrical body (3) and end caps (4). The end caps (4) have pipe fittings (5) fitted in cap apertures (19). The pipe fittings (5) may be threaded (20) for in line attachment to a facility, such as, a personal household main inlet water line. It has been found that the best performing housing (2) is constructed of Schedule 40 polyvinyl chloride, commonly PVC, with a wall thickness of ¼ inches. The PVC is microporous and doesn't allow build up of algicides, corrosion or other contaminants as might occur with other materials. For example, use of metal may lead to electrolytic action. The end caps (4), body (3) and pipe fittings (5) are assembled and sealed by well known PVC methods.

Referring to FIG. 2, the elements comprising the stages of the water filtration system (1) are serially assembled with the water inlet end (6) having a first filter element (7) comprised of a loose weave polyester pad with a compressed thickness of 2 ½ inches. For all filter elements the radius is the approximately 4 inch inside diameter of the housing (2) and the thickness is that after the housing (2) contents have been compressed to 20 p.s.i. unless otherwise described herein. The first filter element (7) is constructed to filter larger particulate matter suspended in the water supply, such as, dirt, rust, fibers, sand and other foreign objects. The weave of the polyester pad is such that the entry section (8) or first half is ½ the density of the exit section (9) or second half of the pad.

The second filter element (10) is comprised of ⅟₁₆ inch diameter irregular polyethylene beads in a 3 inch longitudinal space of the housing (2). These beads trap the larger particulate matter which was not filtered in first filter element (7) and, for example, may consist of sand and algicides which form around the smallest sand particles.

The third filter element (11) is comprised of very fine plain wool filter floss which compresses to about ½ its size when compressed to 20 p.s.i. The floss interacts with the water flow to expand and thus provide a very fine permeable filter to further screen suspended particles in the water. For this third filter element (11) a 4 inch thick filter floss is compressed into a 2 inch space in the housing (2). The seventh filter element (12) is comprised of the same material. In this case an 8 inch thick filter floss is compressed into a 4 inch space.

The fourth (13), sixth (14) and eighth (15) filter elements are comprised of one millimeter wool fiber impregnated with carbon to equal two thirds the fibers total weight. This fiber pad is relatively more dense than the filter floss of the third and seventh filter elements (11, 12). The fourth, sixth and eighth filter elements (13, 14, 15) remove dissolved matter including bacteria and other organisms, chlorine, fuel, acetones, lead and the like.

The fiber or floss filters in the system are of a fine grade compressed to a density such that they will stop the water flow if the water is unsafe. The floss serves as a safety factor like a shut off valve if there is too much debris in the water.

The fifth filter element (16) is comprised of pharmaceutical grade carbon granules, graded such that 1 inch of granules equals 10 inches of charcoal, packed in a 4 ½ inch space of the housing (2). This filter removes dissolved matter including bacteria and other organisms, chlorine, fuel, acetones, color and the like.

The ninth filter element (17) is a fine mesh nylon screen with approximately 1 millimeter openings as an emergency protective device should pressure changes cause damage or loose objects in the filter impact the water outlet end (18) of the water filtration system (1). It blocks items from entering the water supply of the house.

The water filtration system (1) has been described as a 20 inch long by 4 inch diameter water filter. By experiment with the presented internal filter elements this has been found to be the optimum configuration for proper water pressure and flow rate for a normal house. Variance about these dimensions is possible; however, with a 10 inch long filter only about 47% of chlorine is removed and with over 30 inches in length pressure drops in the water system occur. Also if the diameter is widened from approximately 4 inches to 5 inches or greater there is a water pressure drop. Conversely, with a 2 inch diameter housing (2) the pressure and flow rate are reduced to 75% of normal levels.

While the invention has been particularly shown and described with respect to the illustrated and preferred embodiments thereof, it will be understood by those skilled in the art that the foregoing and other changes in form and details may be made therein without departing from the spirit and scope of the invention.

I claim:

1. A device to filter various matter from water comprising:
    a water filtration system with a nine filter element serial staged construction contained in a housing having a water inlet end and a water outlet end each with a pipe fitting wherein;
    a first filter element is a plurality of loose weave polyester fibers;
    a second filter element is comprised of a plurality of irregular polyethylene beads;
    a third filter element and a seventh filter element are a plurality of very fine plain wool filter floss;
    a fourth filter element, a sixth filter element and an eighth filter element are comprised of a plurality of one millimeter wool fibers impregnated with carbon to equal two thirds of the total weight of the wool fibers;
    a fifth filter element is comprised of a plurality pharmaceutical grade carbon granules such that a one inch cubic volume of the carbon granules is equivalent to a ten inch cubic volume of charcoal;
    a ninth filter element is a fine mesh nylon screen; and
    the nine filter elements are compressed collectively to 20 p.s.i. when inserted in the housing.

2. The device as in claim 1 wherein the housing is comprised of a body of hollow cylindrical shape and the body is closed at the water inlet end and the water outlet end by a pair of end caps having a cap aperture defined therein for attachment of the pipe fittings.

3. The device as in claim 2 wherein the body is approximately 4 inches in diameter and the housing is approximately 20 inches in length.

4. The device as in claim 1 wherein the housing is constructed of Schedule 40, polyvinyl chloride.

5. The device as in claim 3 wherein on compression of the nine filter elements to 20 p.s.i.:
    the first filter element is approximately 2 ½ inches thick;
    the second filter element is approximately 3 inches thick;
    the third filter element is approximately 2 inches thick and the seventh filter element is approximately 4 inches thick;
    the fourth filter element, the sixth filter element and the eighth filter element are each approximately ½ inch thick; and
    the fifth filter elements is approximately 4 ½ inches thick.

* * * * *